Patented May 25, 1937

2,081,351

UNITED STATES PATENT OFFICE 2,081,351

PROCESS FOR THE TREATMENT OF PHOSPHORIC ACID

Charles F. Booth and John E. Malowan, Anniston, Ala., assignors, by mesne assignments, to Monsanto Chemical Company, a corporation of Delaware No Drawing. Application September 13, 1934, Serial No. 743,826

6 Claims. (Cl. 23—165)

This invention relates to a method for the treatment of crude phosphoric acid and particularly to a method for removing lead or lead compounds therefrom.

The principal object of the present invention is to provide a method by which lead or compounds thereof may be effectively removed and to render the acid suitable for use in food products.

In previously known methods for the removal of lead from phosphoric acid, it has been the practice to treat the acid with small amounts of hydrogen sulfide and sulfuric acid in combination. The latter reagent removes some lead from the acid as sulfate of lead, but, according to our experience with this method, it is not possible to consistently reduce the lead to less than an average of 12 parts per million. The use of hydrogen sulfide alone, according to our experience, does not remove lead.

When lime is present in the crude acid or when it is purposely added and then an addition of sulfuric acid made, the precipitated calcium sulfate carries down some lead sulfate with it, and a minor reduction of the lead present may be made in this way. Acid treated in this way, however, because of the tendency on the part of the calcium sulfate to form super-saturated solutions, will often cloud after filtration and make a subsequent filtration necessary and, hence, can not be considered as a satisfactory method. Furthermore, this method does not yield the desired low lead content in the acid. For these reasons a simple and reliable treatment for decreasing the lead content of phosphoric acid was much to be desired.

Crude acid to be treated by our process ordinarily will contain from 150 to 400 parts per million of lead, and from 0.06% to 0.40% of CaO, together with other impurities. The acid may be produced by the acid decomposition process or by the volatilization process. In the case of the former process, it will contain appreciable quantities of sulfuric acid and have a concentration of from 12° to 30° Bé. Acid produced by the pyrolytic or volatilization process will be stronger, ordinarily running from 75% to 85% $H_3PO_4$. Both products are susceptible to treatment by our process; however, we have obtained somewhat better results when treating the stronger acid.

By way of illustration we will describe the application of our invention to the stronger acid, it being understood that suitable modification of the procedure may be made when treating the weaker acid.

To a tank of crude phosphoric acid having a strength of between 75% and 85% $H_3PO_4$ and containing from 150 to 400 parts per million of lead and in the neighborhood of 0.20% CaO, we add sufficient sulfuric acid to provide for an excess of from 0.30 to 0.40% $SO_3$ or more over that required to combine with the lead and lime present. The acid may now be filtered, if desired, and ordinarily the filtrate will contain in the neighborhood of from 8 to 15 parts per million of lead together with a small amount of lime which remains in solution. This lead content is, however, still too high for many purposes and we now apply the method comprising our invention in order to effect a further reduction of the lead content.

Our invention is carried out by adding to the acid, which may be filtered or not, as desired, an alkaline earth metal compound, the alkaline earth metal of such compound having an atomic weight greater than that of calcium. Specifically we employ a compound of barium or strontium, which compound may comprise the chloride, hydroxide, sulfate or phosphate or mixtures thereof. We may employ either a water-soluble or water-insoluble compound, but for reasons of efficiency we prefer to use a water-soluble salt.

The proportions of such alkaline earth metal compound employed may be varied somewhat, but usually we use an amount which will not materially reduce the free sulfate content of the acid.

The use of water-soluble barium or strontium compounds is to be preferred, since, upon addition to the acid to be treated, these compounds immediately form a precipitate. In other words, there is no tendency to form a super-saturated solution. In this manner we form a barium or strontium precipitate in the acid, which precipitate we have discovered has the property of occluding lead compounds. This discovery makes possible the reduction of the lead content to a very low figure.

The barium or strontium salt or compound used for treating purposes is best added to the concentrated acid by first preparing a water solution or suspension of the same, and then adding the solution to the acid with stirring.

At this point we may remove the precipitate by any clarification process, such as decantation, centrifuging, filtration with filter aids, etc.

The clarified acid at this stage will be found to contain usually less than 2 parts per million of lead, and will be suitable for most purposes where a substantially lead-free product is desired.

In some cases accelerated clarification may be resorted to by applying the process disclosed in U. S. Patent 1,777,548, granted to one of us. In case this is desirable or necessary, we may choose barium sulfide as the soluble barium compound, preparing an aqueous solution or suspension of the same and then adding such solution to the crude acid. The reaction of the barium sulfide with the acid will liberate hydrogen sulfide which, in turn, will react with arsenious oxide present, as described in the above patent.

Since our process involves the use of relatively small amounts of a barium or strontium salt or compound, usually in the neighborhood of 0.01% of equivalent BaO or SrO based on the weight of acid treated, at times it may be desirable to add additional sulfide from another source, for example, as sodium sulfide or hydrogen sulfide, in order to effect complete precipitation of the arsenic in the acid. This is, of course, always necessary when a barium or strontium compound other than the sulfide is employed. When sufficient arsenious sulfide is produced in the acid it will be found possible to filter the crude acid readily by ordinary processes without resort to the special clarification procedures, and the acid obtained will be substantially free of lead, as above described.

Employing as we do the heavier alkaline earth metal salts or compounds as reagents to remove lead from phosphoric acid, we have found that practically lead-free acid may be produced by operating in lead-lined equipment. This is especially true when a small amount of sulfuric acid is present in the phosphoric acid. One explanation may be that the precipitate formed under these conditions is particularly adherent to the lead walls and effectively prevents corrosion after the lead walls have once been coated. This effect has not been noticed with other lead-removing reagents, hence we believe it to be a new result.

In the preferred embodiment of our invention we add a relatively small amount of a soluble barium compound to phosphoric acid containing a small proportion, preferably 0.3% to 0.4%, $SO_3$ as sulfuric acid. At times we may employ from 0.1% to 0.6% of $SO_3$, depending on the grade of acid made. The amount of barium compound is in the neighborhood of 0.01% of equivalent BaO based on the weight of acid treated, although this proportion may be varied somewhat. The treatment, if desired, may be carried out in lead lined tanks which have been employed in a previous operation and have in this manner been rendered corrosion resistant. A substantially lead-free product, i. e., with the lead content under 2 parts per million, may be consistently obtained by our process.

Although we have shown and described certain specific embodiments of our invention, we are fully aware that many modifications thereof are possible. Our invention, therefore, is not to be restricted except insofar as is necessitated by the prior art or by the spirit of the appended claims.

What we claim is:

1. The method of removing lead compounds from strong phosphoric acid containing a small proportion of sulfuric acid, and containing lead as an impurity, comprising adding to said acid an alkaline earth metal compound selected from the class consisting of compounds of barium and strontium to form a precipitate therein, said compounds being added in amount which will not materially reduce the free sulfate content of the acid, and removing a lead-containing precipitate from the acid.

2. The method of removing lead compounds from strong phosphoric acid containing lead as an impurity and containing also a small proportion of sulfuric acid, comprising adding to said acid a water-soluble barium compound, said compound being added in amount which will not materially reduce the free sulfate content of the acid, and removing a precipitated barium compound containing lead from the acid.

3. The method of removing lead compounds from strong phosphoric acid containing lead as an impurity and containing also a small proportion of sulfuric acid, comprising adding to said acid a water-soluble strontium compound, said compound being added in amount which will not materially reduce the free sulfate content of the acid, and removing a precipitated strontium compound containing lead from the acid.

4. The process of removing lead compounds from concentrated phosphoric acid containing lead as an impurity, comprising adding to such acid a quantity of sulfuric acid equivalent to from 0.1% to 0.6% of $SO_3$ as free $H_2SO_4$ and a soluble barium salt equivalent to approximately 0.01% BaO, and removing the precipitate from said acid.

5. The process of removing lead compounds from concentrated phosphoric acid containing lead as an impurity, comprising adding to such acid a quantity of sulfuric acid equivalent to from 0.3% to 0.4% of $SO_3$ as free $H_2SO_4$ and an amount of barium sulfide equivalent to approximately 0.01% BaO, both based upon the weight of acid, and then removing the barium-containing precipitate from the acid.

6. The process of removing lead compounds from concentrated phosphoric acid containing lead as an impurity, comprising adding to such acid a quantity of sulfuric acid equivalent to from 0.3% to 0.4% of $SO_3$ as free $H_2SO_4$ and an amount of barium sulfide equivalent to approximately 0.01% BaO, both based upon the weight of acid, and then removing the barium-containing precipitate by precipitating arsenious sulfide in said acid and removing the combined precipitate in one filtration.

CHARLES F. BOOTH.
JOHN E. MALOWAN.